(12) United States Patent
Sugawara et al.

(10) Patent No.: US 12,278,060 B2
(45) Date of Patent: Apr. 15, 2025

(54) SOLID ELECTROLYTIC CAPACITOR AND METHOD FOR MANUFACTURING SOLID ELECTROLYTIC CAPACITOR COMPRISING A BLOCK LAYER FORMED USING A CONDUCTIVE POLYMER HETEROGENEOUSLY DOPED WITH A POLYMER DOPANT

(71) Applicant: TOKIN Corporation, Shiroishi (JP)

(72) Inventors: Yasuhisa Sugawara, Shiroishi (JP); Masami Ishijima, Shiroishi (JP); Tadamasa Asami, Shiroishi (JP); Yusuke Hoshina, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 376 days.

(21) Appl. No.: 17/812,325

(22) Filed: Jul. 13, 2022

(65) Prior Publication Data
US 2023/0026186 A1   Jan. 26, 2023

(30) Foreign Application Priority Data

Jul. 14, 2021 (JP) ................... 2021-116081
Feb. 18, 2022 (JP) ................... 2022-023393

(51) Int. Cl.
*H01G 9/025* (2006.01)
*H01G 9/00* (2006.01)
*H01G 9/15* (2006.01)

(52) U.S. Cl.
CPC .......... *H01G 9/025* (2013.01); *H01G 9/0036* (2013.01); *H01G 9/15* (2013.01)

(58) Field of Classification Search
CPC ........ H01G 9/025; H01G 9/0036; H01G 9/15; H01G 9/042; H01G 9/07; H01G 9/028; H01G 9/0032
See application file for complete search history.

(56) References Cited

U.S. PATENT DOCUMENTS 5,586,000 A * 12/1996 Sakata .................. H01G 11/48
29/25.03
2014/0328007 A1* 11/2014 Endo .................... H01G 9/0036
29/25.03

(Continued)

FOREIGN PATENT DOCUMENTS

JP          H0669082 A      3/1994

*Primary Examiner* — Nathan Milakovich
*Assistant Examiner* — Daniel M Dubuisson
(74) *Attorney, Agent, or Firm* — McCoy Russell LLP

(57) ABSTRACT

A solid electrolytic capacitor according to one aspect of the present disclosure includes: an anode body made of a valve metal; a dielectric layer formed on the anode body; and a solid electrolyte layer formed on the dielectric layer. The solid electrolyte layer includes: a first conductive polymer layer formed on the dielectric layer and heterogeneously doped with a monomolecular dopant; a block layer formed on the first conductive polymer layer; and a second conductive polymer layer formed on the block layer and composed of a self-doped-type conductive polymer containing a plurality of side chains containing a functional group that can be doped. The block layer blocks a migration of the self-doped-type conductive polymer from the second conductive polymer layer into the first conductive polymer layer and/or a migration of the self-doped-type conductive polymer from the second conductive polymer layer into pores of the porous anode body.

13 Claims, 4 Drawing Sheets

(56) References Cited

U.S. PATENT DOCUMENTS

| | | | |
|---|---|---|---|
| 2014/0340819 A1* | 11/2014 | Zhang | H01G 9/028 |
| | | | 361/523 |
| 2015/0262754 A1* | 9/2015 | Nagashima | H01G 9/0036 |
| | | | 427/79 |
| 2015/0337061 A1* | 11/2015 | Yano | C07D 495/04 |
| | | | 526/135 |
| 2016/0211082 A1* | 7/2016 | Shi | H01G 9/0032 |
| 2017/0092429 A1* | 3/2017 | Uka | H01G 9/048 |
| 2017/0098510 A1* | 4/2017 | Uka | H01G 9/028 |
| 2017/0309406 A1* | 10/2017 | Tanimoto | H01G 9/0425 |
| 2018/0108488 A1* | 4/2018 | Yamaguchi | H01G 9/0425 |
| 2018/0158618 A1* | 6/2018 | Yamaguchi | H01G 9/15 |
| 2018/0208713 A1* | 7/2018 | Scheel | H01G 9/025 |
| 2021/0166886 A1* | 6/2021 | Hong | H01G 9/0525 |
| 2022/0084756 A1* | 3/2022 | Fukui | H01G 9/028 |
| 2022/0415581 A1* | 12/2022 | Umahashi | H01G 9/028 |
| 2023/0245836 A1* | 8/2023 | Takeshita | H01G 9/028 |
| | | | 361/525 |

* cited by examiner

SOLID ELECTROLYTIC CAPACITOR AND METHOD FOR MANUFACTURING SOLID ELECTROLYTIC CAPACITOR COMPRISING A BLOCK LAYER FORMED USING A CONDUCTIVE POLYMER HETEROGENEOUSLY DOPED WITH A POLYMER DOPANT

CROSS-REFERENCE TO RELATED APPLICATIONS

The present application claims priority to Japanese Patent Application No. 2021-116081, filed on Jul. 14, 2021, and Japanese Patent Application No. 2022-23393, filed on Feb. 18, 2022. The entire contents of the above-listed applications are hereby incorporated by reference for all purposes.

BACKGROUND

The present disclosure relates to a solid electrolytic capacitor and a method for manufacturing the solid electrolytic capacitor.

In recent years, solid electrolytic capacitors have been widely used in various fields such as the field of electronic devices. Japanese Unexamined Patent Application Publication No. H06-69082 discloses a technology for a solid electrolytic capacitor in which a conductive polymer is used as a solid electrolyte.

SUMMARY

Japanese Unexamined Patent Application Publication No. H06-69082 discloses a technique regarding a solid electrolytic capacitor that uses conductive polymers as a solid electrolyte. If, for example, the conductive polymers are formed using chemical polymerization, the density of the formed conductive polymers becomes low and a number of voids are formed in the conductive polymers. Further, edge coverage is poor, and thus there is a problem that an amount of leakage current increases.

On the other hand, if, for example, the conductive polymers are formed using a solution in which conductive polymers heterogeneously doped with a polymer dopant (paint type) are dispersed instead of forming the conductive polymers using chemical polymerization, a film-like conductive polymer layer can be obtained. This formation method using the solution, where a film-like conductive polymer layer can be obtained, has an advantage that the density of conductive polymers is high compared to that in the case of the formation method in which the conductive polymers are formed using chemical polymerization. However, this formation method using the above solution also has the same problem as that of the method using chemical polymerization that the leakage current increases due to poor edge coverage.

Further, by forming a thick conductive polymer layer by repeatedly using a solution in which conductive polymers heterogeneously doped with a polymer dopant (paint type) are dispersed, conductive polymers whose edges are sufficiently covered can be obtained. In this case, however, since a planar part of the capacitor element also becomes thick, the volume efficiency is reduced and thus a large-capacity solid electrolytic capacitor cannot be obtained.

In view of the above-described problem, an object of the present disclosure is to provide a solid electrolytic capacitor capable of preventing a leakage current from increasing, and a method for manufacturing the solid electrolytic capacitor.

A solid electrolytic capacitor according to one aspect of the present disclosure includes: an anode body made of a valve metal; a dielectric layer formed on the anode body; and a solid electrolyte layer formed on the dielectric layer. The solid electrolyte layer includes: a first conductive polymer layer that is formed on the dielectric layer and is heterogeneously doped with a monomolecular dopant; a block layer formed on the first conductive polymer layer; and a second conductive polymer layer that is formed on the block layer and is composed of a self-doped-type conductive polymer containing a plurality of side chains containing a functional group that can be doped. The block layer blocks a migration of the self-doped-type conductive polymer from the second conductive polymer layer into the first conductive polymer layer and/or a migration of the self-doped-type conductive polymer from the second conductive polymer layer into pores of the porous anode body.

A solid electrolytic capacitor according to one aspect of the present disclosure includes: an anode body made of a valve metal; a dielectric layer formed on the anode body; and a solid electrolyte layer formed on the dielectric layer. The solid electrolyte layer includes: a first conductive polymer layer that is formed on the dielectric layer and is heterogeneously doped with a monomolecular dopant; and a second conductive polymer layer that is formed on the first conductive polymer layer and is composed of a self-doped-type conductive polymer containing a plurality of side chains containing a functional group that can be doped, in which the ratio of the film thickness of a corner part of the second conductive polymer layer to the film thickness of a planar part of the second conductive polymer layer is not less than 0.5 nor more than 1.5.

A solid electrolytic capacitor according to one aspect of the present disclosure includes: an anode body made of a valve metal; a dielectric layer formed on the anode body; and a solid electrolyte layer formed on the dielectric layer. The solid electrolyte layer includes: a block layer formed on the dielectric layer; and a conductive polymer layer that is formed on the block layer and is composed of a self-doped-type conductive polymer containing a plurality of side chains containing a functional group that can be doped, in which the block layer blocks a migration of the self-doped-type conductive polymer from the conductive polymer layer to the dielectric layer.

A method for manufacturing a solid electrolytic capacitor according to one aspect of the present disclosure includes: forming a dielectric layer on an anode body made of a valve metal; and forming a solid electrolyte layer on the dielectric layer. The forming of the solid electrolyte layer includes: forming, on the dielectric layer, a first conductive polymer layer heterogeneously doped with a monomolecular dopant; forming a block layer on the first conductive polymer layer; and forming, on the block layer, a second conductive polymer layer composed of a self-doped-type conductive polymer containing a plurality of side chains containing a functional group that can be doped. The block layer is formed of a material capable of blocking a migration of the self-doped-type conductive polymer from the second conductive polymer layer into the first conductive polymer layer and/or a migration of the self-doped-type conductive polymer from the second conductive polymer layer into pores of the porous anode body.

According to the present disclosure, it is possible to provide a solid electrolytic capacitor capable of preventing a leakage current from increasing, and a method for manufacturing the solid electrolytic capacitor.

The above and other objects or features of the present disclosure will become more fully understood from the detailed description given hereinbelow and the accompanying drawings which are given by way of illustration only, and thus are not to be considered as limiting the present disclosure.

DETAILED DESCRIPTION

Embodiments according to the present disclosure will be described hereinafter with reference to the drawings.

Figure 1:
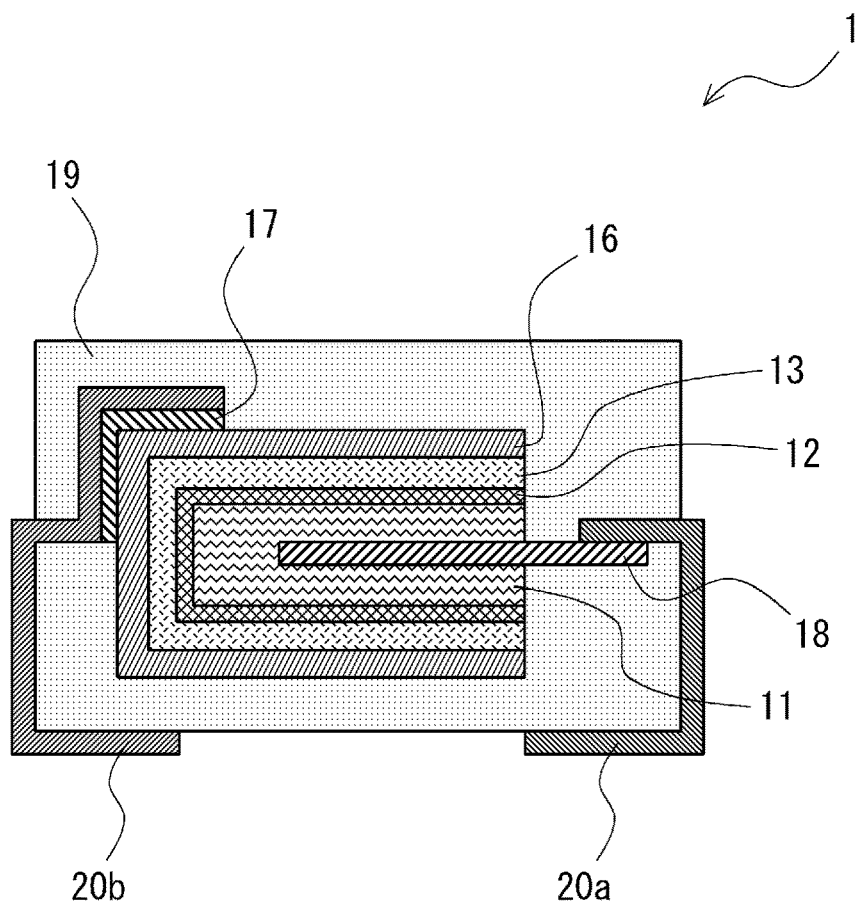
FIG. 1 is a cross-sectional diagram of a solid electrolytic capacitor according to an embodiment.

FIG. 1 shows a cross-sectional diagram of a solid electrolytic capacitor according to an embodiment. As shown in FIG. 1, a solid electrolytic capacitor 1 according to this embodiment includes an anode body 11, a dielectric layer 12, a solid electrolyte layer 13, a cathode layer 16, a conductive adhesive 17, an anode lead 18, an exterior resin 19, and lead frames 20a and 20b.

The anode body 11 is formed by using a porous valve metal. For example, the anode body 11 can be formed by using at least one substance selected from tantalum (Ta), aluminum (Al), niobium (Nb), titanium (Ti), zirconium (Zr), hafnium (Hf), and tungsten (W), or using an alloy of these metals. In particular, the anode body 11 may be formed by using at least one substance selected from tantalum (Ta), aluminum (Al), and niobium (Nb), or using an alloy of these metals. The anode 11 is formed, for example, by using a plate, foil, or wire-like valve metal, a sintered body containing fine particles of a valve metal, or a porous valve metal that has been subjected to a surface-enlarging treatment by etching.

The dielectric layer 12 is formed on the surface of the anode body 11. For example, the dielectric layer 12 can be formed by anodizing the surface of the anode body 11. For example, the surface of the anode body 11 is porous, and the dielectric layer 12 is also formed in pores of the porous surface. For example, in the case where tantalum is used for the anode body 11, it is possible to form a tantalum oxide film (i.e., the dielectric layer 12) on the surface of the anode body 11 by anodizing the anode body 11. For example, it is possible to adjust the thickness of the dielectric layer 12 by changing the voltage of the anodizing process.

The solid electrolyte layer 13 is formed on the dielectric layer 12. That is, the solid electrolyte layer 13 is formed so as to be in contact with the entire surface of the dielectric layer 12. Details of the solid electrolyte layer 13 will be described later.

The cathode layer 16 is formed on the solid electrolyte layer 13. The cathode layer 16 can be formed, for example, by laminating a carbon layer and a silver layer. Note that the carbon layer and the silver layer are merely examples and the material constituting the cathode layer 16 is not limited to any particular material as long as the material is electrically conductive.

As described above, in the solid electrolytic capacitor 1 according to this embodiment, the dielectric layer 12, the solid electrolyte layer 13, and the cathode layer 16 are laminated one after another on the anode body 11. The anode body 11 includes the anode lead 18, and the anode lead 18 is connected to the lead frame 20a. For example, the anode lead 18 is connected to the lead frame 20a by welding. Further, the cathode layer 16 is connected to the lead frame 20b through the conductive adhesive 17. The solid electrolytic capacitor 1 according to this embodiment, except for parts of the two lead frames 20a and 20b (i.e., only parts of the two lead frames 20a and 20b are exposed to the outside), is covered by the exterior resin 19.

Figure 2:
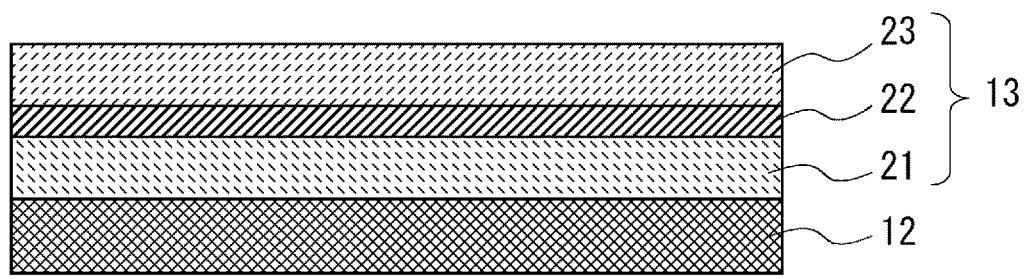
FIG. 2 is a cross-sectional diagram showing one example of a solid electrolyte layer included in the solid electrolytic capacitor according to the embodiment.

Next, details of the solid electrolyte layer 13 included in the solid electrolytic capacitor 1 according to this embodiment will be described. FIG. 2 is a cross-sectional diagram of an example of the solid electrolyte layer included in the solid electrolytic capacitor according to this embodiment, and is an enlarged cross-sectional diagram of a part of the solid electrolytic capacitor 1 shown in FIG. 1, including the dielectric layer 12 and the solid electrolyte layer 13.

As shown in FIG. 2, the solid electrolyte layer 13 includes a first conductive polymer layer 21, a block layer 22, and a second conductive polymer layer 23.

The first conductive polymer layer 21 is formed on the dielectric layer 12. The first conductive polymer layer 21 may be a conductive polymer heterogeneously doped with a monomolecular dopant. For example, at least one substance selected from a group consisting of polypyrrole, polythiophene, polyaniline, and derivatives thereof can be used for the first conductive polymer. In this embodiment, the first conductive polymer layer 21 is formed using chemical polymerization.

The block layer 22 is formed on the first conductive polymer layer 21. The block layer 22 is formed using a conductive polymer heterogeneously doped with a polymer dopant. The conductive polymer heterogeneously doped with the polymer dopant functions as a film-like block layer (an inhibiting layer). Further, the block layer 22 may be formed of, for example, a material including amine or amine salt. When the block layer 22 includes the material including amine or amine salt, the block layer 22 functions as a block layer (an inhibiting layer) by electrical trapping. Further, the material including amine or amine salt may be at least one of a self-doped-type conductive polymer containing amine and a conductive polymer heterogeneously doped with a polymer dopant containing amine. Doping of polar groups in one molecule is herein described as "self-doped", while doping of a dopant of different molecules is described as "heterogeneously doped".

Further, in this embodiment, an antioxidant may be used for the block layer 22 (the inhibiting layer). The antioxidant may be formed on the first conductive polymer layer 21 or near the first conductive polymer layer 21 in a dispersed manner. As described above, a conductive polymer heterogeneously doped with a monomolecular dopant is used for the first conductive polymer layer 21. Therefore, the first conductive polymer layer 21 often has a sponge-like shape whose density is low, and the antioxidant has a property that it is easily adhered to this sponge-like first conductive polymer layer 21. Therefore, the antioxidant has a block function, just like the aforementioned block layer 22 does.

Further, the antioxidant includes a function of inhibiting oxidative degradation in the first conductive polymer layer 21 due to intrusion of external oxygen. The antioxidant may be the one generally used for plastics. Further, in order to obtain high antioxidant property, the antioxidant may be at least one compound selected from the group consisting of phenol compounds, benzophenone compounds, salicylic acid compounds, and benzotriazole compounds.

The block layer 22 may be formed using only one of the aforementioned materials or may be formed by combining a plurality of the aforementioned materials. In other words, the block layer 22 may be a single layer or may be a plurality of layers. When, for example, the block layer 22 is formed using the antioxidant, the block layer 22 (single layer) including the antioxidant may be formed on the first conductive polymer layer 21. Further, a first block layer including the antioxidant may be formed on the first conductive polymer layer 21 and a second block layer including the conductive polymer heterogeneously doped with the polymer dopant may be formed on the first block layer, whereby a plurality of block layers 22 may be formed. Alternatively, a first block layer including the antioxidant may be formed on the first conductive polymer layer 21 and a second block layer including amine or amine salt may be formed on the first block layer, whereby a plurality of block layers 22 may be formed.

The second conductive polymer layer 23 is formed on the block layer 22. For the second conductive polymer layer 23, a self-doped-type conductive polymer containing a plurality of side chains containing a functional group that can be doped can be used. For example, the second conductive polymer can be formed using a self-doped-type conductive polymer that is composed of polypyrrole, polythiophene, or polyaniline, and that contains a plurality of side chains containing a functional group that can be doped. When a plurality of second conductive polymer layers 23 are formed using the self-doped-type conductive polymer, the block layer 22 may be formed between a self-doped-type conductive polymer and another self-doped-type conductive polymer. That is, a plurality of block layers 22 and a plurality of second conductive polymer layers 23 may be alternately laminated on the first conductive polymer layer 21.

In this embodiment, the block layer 22 blocks a migration of the self-doped-type conductive polymer from the second conductive polymer layer 23 to the first conductive polymer layer 21. Further, in this embodiment, the block layer 22 may block a migration of the self-doped-type conductive polymer from the second conductive polymer layer 23 into pores of the porous anode body 11 (see FIG. 1).

As described above, in this embodiment, the block layer 22 provided between the first conductive polymer layer 21 and the second conductive polymer layer 23 enables to block the migration of the self-doped-type conductive polymer constituting the second conductive polymer layer 23 into the first conductive polymer layer 21 and the pores of the porous anode body 11. Therefore, it is possible to maintain the shape of the second conductive polymer layer 23 and prevent the edge coverage of the second conductive polymer layer 23 from being degraded. Accordingly, it is possible to prevent the leakage current of the solid electrolytic capacitor from increasing.

In this embodiment, the ratio of the film thickness of a corner part of the second conductive polymer layer 23 (the conductive polymer layer formed in the outside) to the film thickness of a planar part thereof is not less than 0.5 nor more than 1.5, not less than 0.7 nor more than 1.5, or not less than 1.0 nor more than 1.4.

Figure 3:
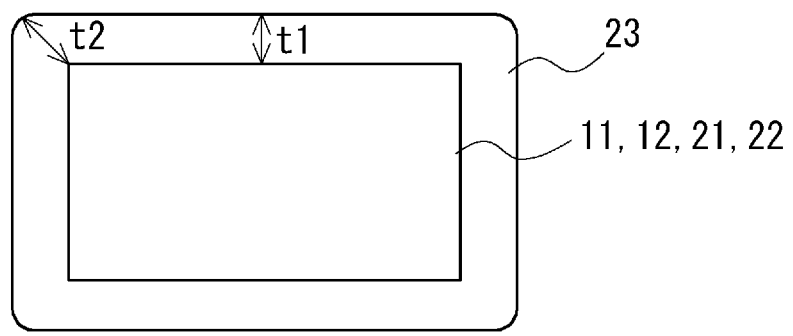
FIG. 3 is a cross-sectional diagram of the solid electrolytic capacitor according to the embodiment.

The ratio of the film thickness of the corner part to the film thickness of the planar part is the ratio of a film thickness t2 of the corner part to the film thickness t1 of the planar part of the second conductive polymer layer 23 shown in FIG. 3 (=t2/t1). The planar part corresponds to the flat part of the anode body 11, typically near the center part of the anode body 11. The corner part corresponds to an edge (corner) of the anode body 11 and the film thickness t2 of the corner part corresponds to the film thickness from the surface of the corner part of the block layer 22 to the corner part of the second conductive polymer layer 23.

In this embodiment, the ratio of the film thickness of the corner part of the second conductive polymer layer 23 to the film thickness of the planar part of the second conductive polymer layer 23 is not less than 0.5 nor more than 1.5, whereby the edge part of the anode body 11 can be definitely covered with the second conductive polymer layer 23. Therefore, it is possible to prevent the leakage current of the solid electrolytic capacitor from increasing.

Figure 4:
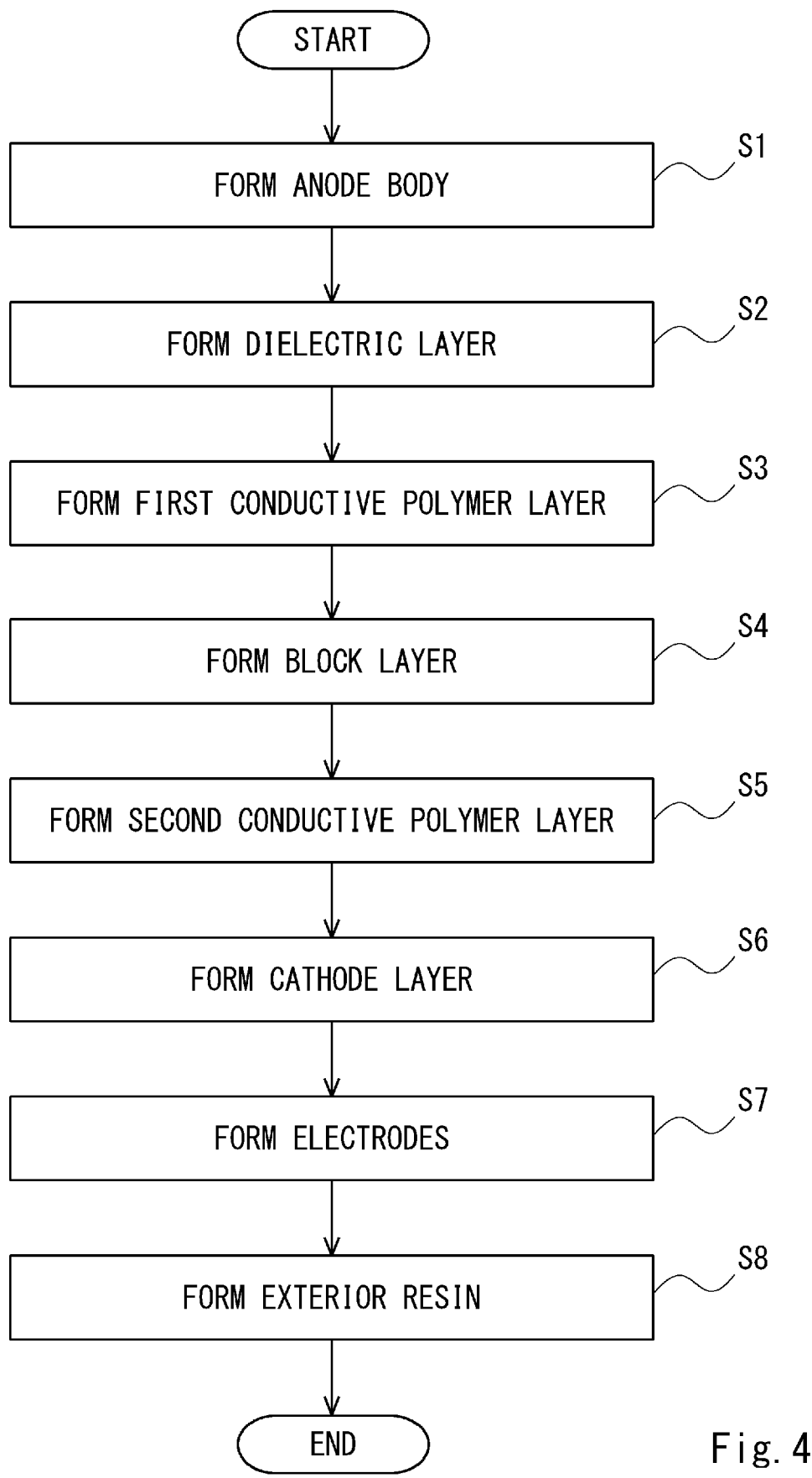
FIG. 4 is a flowchart for describing a method for manufacturing the solid electrolytic capacitor according to the embodiment.

Next, a method for manufacturing the solid electrolytic capacitor according to this embodiment will be described. FIG. 4 is a flowchart for describing the method for manufacturing the solid electrolytic capacitor according to this embodiment. Hereinafter, with reference to FIGS. 1 and 2, the method for manufacturing the solid electrolytic capacitor will be described.

When the solid electrolytic capacitor according to this embodiment is manufactured, the anode body 11 is formed first (Step S1). A valve metal may be used for the anode body 11. The valve metal may be made of the aforementioned materials.

Next, the dielectric layer 12 is formed on the surface of the anode body 11 by anodizing the anode body (the valve metal) 11 (Step S2). After that, the first conductive polymer layer 21 is formed on the dielectric layer 12 (Step S3). A conductive polymer heterogeneously doped with a monomolecular dopant may be used for the first conductive polymer layer 21. For example, the first conductive polymer may be at least one substance selected from a group consisting of polypyrrole, polythiophene, polyaniline, and derivatives thereof. In this embodiment, the first conductive polymer layer 21 is formed using chemical polymerization. For example, after the first conductive polymer layer is formed by using chemical polymerization, the formed first conductive polymer layer 21 is washed by using a solvent (water, alcohol, etc.), so that unreacted substances and the residue of the oxidizer and the like may be removed.

As an example, the anode body 11 with the dielectric layer 12 formed thereon (hereinafter also referred to simply as the anode body 11) is immersed in an aqueous solution of iron(III) p-toluenesulfonate, and then dried to remove the moisture therefrom, so that a crystal of an oxidizer is formed on the dielectric layer 12. Next, the anode body 11 is immersed in an undiluted solution of 3,4-ethylene dioxythiophene and made to undergo a chemical polymerization reaction with the crystal of the oxidizer. After that, the anode body 11 is washed with water and alcohol, so that unreacted substances and the residue of the oxidizer are removed therefrom. Thorough the above-described series of processes, the first conductive polymer layer 21 can be formed on the surface of the dielectric layer 12. Note that the above-described method for forming the first conductive polymer layer 21 is merely an example, and in this embodiment, the first conductive polymer layer 21 may be formed by using other methods.

Next, the block layer 22 is formed on the first conductive polymer layer 21 (Step S4). The block layer 22 may be formed using the conductive polymer heterogeneously doped with the polymer dopant. The block layer 22 may be formed using, for example, a material including amine or amine salt. The material including amine or amine salt may be at least one of a self-doped-type conductive polymer containing amine and the conductive polymer heterogeneously doped with the polymer dopant containing amine. Further, the block layer 22 may be formed using an antioxidant. The block layer 22 may be formed using only one of the aforementioned materials or may be formed by combining a plurality of the aforementioned materials. In other words, the block layer 22 may either be a single layer or a plurality of layers.

Next, the second conductive polymer layer 23 is formed on the block layer 22 (Step S5). For the second conductive polymer layer 23, a self-doped-type conductive polymer containing a plurality of side chains containing a functional group that can be doped can be used. For example, the second conductive polymer may be formed u sing a self-doped-type conductive polymer that is composed of polypyrrole, polythiophene, or polyaniline, and that contains a plurality of side chains containing a functional group that can be doped.

As an example, the anode body 11 in which the block layer 22 has been formed is immersed in a solution containing a material for the second conductive polymer layer 23, and dried at a predetermined temperature for a predetermined time, so that the second conductive polymer layer 23 can be formed. As described above, the formation of the block layer 22 (Step S4) and the formation of the second conductive polymer layer 23 (Step S5) may be alternately repeated a plurality of times. In this case, the plurality of block layers 22 and the plurality of second conductive polymer layers 23 are alternately laminated on the first conductive polymer layer 21.

After the second conductive polymer layer 23 is formed, the cathode layer 16 is formed (Step S6). The cathode layer 16 can be formed by laminating, for example, a carbon layer and a silver layer.

Next, the lead frames (electrodes) 20a and 20b are formed (Step S7). Specifically, the lead frame 20a is connected to the anode lead 18 by using welding. Further, the lead frame 20b is connected to the cathode layer 16 by using the conductive adhesive 17.

After that, the exterior resin 19 is formed (Step S8). Note that the exterior resin 19 is formed so that parts of the two lead frames 20a and 20b are exposed to the outside. There are not particular restrictions on the resin used for the exterior resin 19. For example, thermosetting epoxy resin or a method for curing a liquid resin can be used.

By using the method for manufacturing the solid electrolytic capacitor described above, it is possible to manufacture the solid electrolytic capacitor according to this embodiment.

As described above, in this embodiment, the block layer 22 is provided between the first conductive polymer layer 21 and the second conductive polymer layer 23. Therefore, it is possible to block the migration of the self-doped-type conductive polymer constituting the second conductive polymer layer 23 into the first conductive polymer layer 21 and the pores of the porous anode body 11. Accordingly, it is possible to maintain the shape of the second conductive polymer layer 23 and prevent the edge coverage of the second conductive polymer layer 23 from being degraded. Therefore, it is possible to prevent the leakage current of the solid electrolytic capacitor from increasing.

Figure 5:
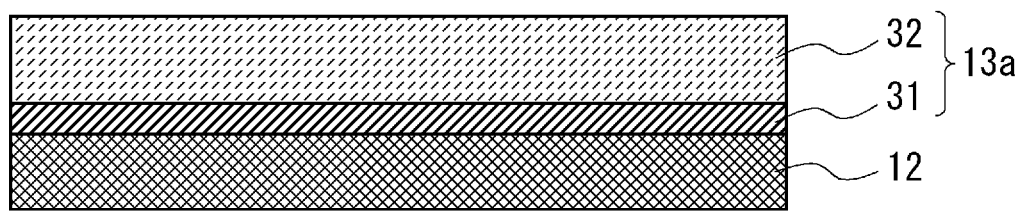
FIG. 5 is a cross-sectional diagram showing another example of the solid electrolyte layer included in the solid electrolytic capacitor according to the embodiment.

Next, another configuration example of the solid electrolytic capacitor according to this embodiment will be described. FIG. 5 is a cross-sectional diagram showing another example of the solid electrolyte layer included in the solid electrolytic capacitor according to this embodiment. A solid electrolyte layer 13a shown in FIG. 5 includes a block layer 31 and a conductive polymer layer 32.

The block layer 31 is formed on the dielectric layer 12. The block layer 31 is formed using the conductive polymer heterogeneously doped with the polymer dopant. The conductive polymer heterogeneously doped with the polymer dopant functions as a film-like block layer (an inhibiting layer). Further, for example, the block layer 31 may be formed of a material including amine or amine salt. When the block layer 31 includes the material including amine or amine salt, it functions as a block layer (an inhibiting layer) by electrical trapping. Further, the material including amine or amine salt may be at least one of a self-doped-type conductive polymer containing amine and a conductive polymer heterogeneously doped with the polymer dopant containing amine.

The conductive polymer layer 32 is formed on the block layer 31. For the conductive polymer layer 32, a self-doped-type conductive polymer containing a plurality of side chains containing a functional group that can be doped may be used. For example, the conductive polymer may be formed using a self-doped-type conductive polymer that is composed of polypyrrole, polythiophene, or polyaniline, and that contains a plurality of side chains containing a functional group that can be doped.

In this embodiment, the block layer 31 blocks a migration of the self-doped-type conductive polymer from the conductive polymer layer 32 into the pores of the porous anode body 11 (see FIG. 1).

In the configuration shown in FIG. 5, the block layer 31 provided between the dielectric layer 12 and the conductive polymer layer 32 enables to block the migration of the self-doped-type conductive polymer that composes the conductive polymer layer 32 into the pores of the porous anode body 11. Therefore, it is possible to maintain the shape of the conductive polymer layer 32 and prevent the edge coverage of the conductive polymer layer 32 from being degraded. Accordingly, it is possible to prevent the leakage current of the solid electrolytic capacitor from increasing.

In the configuration shown in FIG. 5, the ratio of the film thickness of a corner part of the conductive polymer layer 32 to the film thickness of a planar part of the conductive polymer layer 32 is not less than 0.5 nor more than 1.5, or not less than 0.7 nor more than 1.5, or not less than 1.0 nor more than 1.4.

EXAMPLES

While the present disclosure will be described further in detail based on Examples, the present disclosure is not limited to the following Examples.

Example 1

Firstly, a capacitor element was formed by anodizing a sintered body of a tantalum fine powder, which was used as a valve metal, with a voltage of 50 V in a phosphoric acid aqueous solution and thereby forming a dielectric layer made of tantalum oxide on the entire surface of the sintered body of the tantalum fine powder.

Next, the capacitor element covered with the surface treatment agent layer was immersed in a 30 wt % iron(II) p-toluenesulfonate methanol solution, which was used as an oxidizer and a dopant, for 10 minutes and then dried at a room temperature for 30 minutes. After that, the capacitor element was immersed in 3,4-ethylenedioxythiophene of a thiophene derivative, which was a monomer that provides a conductive polymer, for 10 minutes. Then, the capacitor element was kept at a room temperature for 30 minutes and hence 3,4-ethylenedioxythiophene was polymerized. After that, unreacted substances and residues of the oxidizer were washed out by immersing the capacitor element in ethanol. A first conductive polymer layer composed of polyethylene dioxythiophene (PEDOT) doped with p-toluenesulfonic acid was formed on the dielectric layer by repeating the above-described series of polymerization operations including the charging (i.e., the adding) of the oxidizer, and the charging and washing of 3,4-ethylenedioxythiophene eight times.

Next, the capacitor element in which the first conductive polymer layer was formed was immersed in a PEDOT-PSS aqueous dispersion liquid, which is a dispersion liquid of a conductive polymer with which polystyrene sulfonic acid (PSS), which is a polymer dopant, was doped, and was pulled up therefrom. After that, the obtained capacitor element was dried at 120° C. for 30 minutes, and then a block layer composed of a film-like conductive polymer was formed on the first conductive polymer layer.

Next, a capacitor element where the block layer was formed was immersed in a conductive polymer aqueous solution in which the self-doped-type PEDOT containing a plurality of side chains containing a functional group that can be doped is dissolved and was pulled up therefrom. After that, the obtained capacitor element was dried at 120° C. for 30 minutes, whereby a film-like conductive polymer was formed. This operation was repeated three times to form a second conductive polymer layer composed of a self-doped-type conductive polymer on the block layer.

After the second conductive polymer layer was formed, a pellet(s) was immersed in the graphite paste, pulled up therefrom, and then dried at 120° C. for one hour, whereby a graphite layer was formed. After the graphite layer was formed, the pellet was immersed in a silver paste, pulled up therefrom, and then dried at 120° C. for one hour, whereby a silver layer was formed. Next, valve metal leads were welded and connected to the electrodes. Further, the silver layer was connected to the electrodes by using a conductive adhesive. After that, a solid electrolytic capacitor was manufactured by forming the exterior resin.

Table 1 shows a leakage current failure rate at the time of an inspection performed when the solid electrolytic capacitor was manufactured, the film thickness of the corner part of the second conductive polymer layer, and the ratio of the film thickness of the corner part of the second conductive polymer layer to the film thickness of the planar part of the second conductive polymer layer. The film thickness and the ratio of the film thicknesses were calculated by polishing 20 solid electrolytic capacitors after being manufactured and observing the cross sections of them.

Example 2

A solid electrolytic capacitor was manufactured by the same method as in Example 1 except that the block layer was formed using 1,10-decane diamine instead of using PEDOT-PSS.

Specifically, the capacitor element in which a first conductive polymer layer was formed was immersed in a 1,10-decane diamine aqueous solution and was pulled up therefrom. After that, the obtained capacitor element was dried at 105° C. for 20 minutes, whereby a block layer made of a crystal of 1,10-decane diamine was formed on the first conductive polymer layer. Like in Example 1, the leakage current failure rate at the time of an inspection performed when the solid electrolytic capacitor was manufactured, the film thickness of the corner part of the second conductive polymer layer, and the ratio of the film thickness of the corner part of the second conductive polymer layer to the film thickness of the planar part of the second conductive polymer layer are shown in Table 1.

Example 3

A solid electrolytic capacitor was manufactured by the same method as in Example 1 except that the block layer was formed using a conductive polymer aqueous solution in which a self-doped-type PEDOT containing a plurality of side chains containing a functional group that can be doped and a plurality of side chains containing secondary amine was dissolved instead of using PEDOT-PSS.

Specifically, a capacitor element in which a first conductive polymer layer was formed was immersed in a conductive polymer aqueous solution in which the self-doped-type PEDOT containing a plurality of side chains containing a functional group that can be doped and a plurality of side chains containing secondary amine was dissolved and was pulled up therefrom. After that, the obtained capacitor element was dried at 105° C. for 20 minutes, whereby the block layer made of the self-doped-type PEDOT was formed on the first conductive polymer layer. Like in Example 1, the leakage current failure rate at the time of an inspection performed when the solid electrolytic capacitor was manufactured, the film thickness of the corner part of the second conductive polymer layer, and the ratio of the film thickness of the corner part of the second conductive polymer layer to the film thickness of the planar part of the second conductive polymer layer are shown in Table 1.

Example 4

A solid electrolytic capacitor was manufactured by the same method as in Example 1 except that the block layer was formed using hydroxybenzenes instead of using PEDOT-PSS.

Specifically, a capacitor element in which a first conductive polymer layer was formed was immersed in an ethanol solution in which trihydroxybenzoic acid having an antioxidant function was dissolved and was pulled up therefrom. After that, the obtained capacitor element was dried at a room temperature for 60 minutes, whereby a block layer made of antioxidant was formed on the first conductive polymer layer. Like in Example 1, the leakage current failure rate at the time of an inspection performed when the solid electrolytic capacitor was manufactured, the film thickness of the corner part of the second conductive polymer layer, and the ratio of the film thickness of the corner part of the second conductive polymer layer to the film thickness of the planar part of the second conductive polymer layer are shown in Table 1.

Example 5

A solid electrolytic capacitor was manufactured by the same method as in Example 1 until the first conductive polymer layer was formed on the dielectric layer.

After that, the capacitor element in which the first conductive polymer layer was formed was immersed in an ethanol solution in which trihydroxybenzoic acid having an antioxidant function was dissolved and was pulled up therefrom. After that, the obtained capacitor element was dried at a room temperature for 60 minutes, whereby a first block layer made of the antioxidant was formed on the first conductive polymer layer.

Next, like in Example 1, a second conductive polymer layer made of a self-doped-type PEDOT containing a plurality of side chains containing a functional group that can be doped was formed. After that, the capacitor element in which the second conductive polymer layer was formed was immersed in the 1,10-decane diamine aqueous solution and was pulled up therefrom. Then, the obtained capacitor element was dried at 105° C. for 20 minutes, whereby a second block layer made of a crystal of 1,10-decane diamine was formed on the second conductive polymer layer.

Next, a third conductive polymer layer made of a self-doped-type PEDOT containing a plurality of side chains containing a functional group that can be doped was formed on the above second block layer, like in Example 1. The formation of the second block layer and the formation of the third conductive polymer layer were repeated once again, whereby a third block layer and a fourth conductive polymer layer were formed.

If the formation of the block layer and the formation of the conductive polymer layer (self-doped-type PEDOT) are repeated two to ten times, the film thicknesses of the conductive polymer layers can be made uniform.

Like in Example 1, the leakage current failure rate at the time of an inspection performed when the solid electrolytic capacitor was manufactured, the film thickness of the corner part of each of the second to fourth conductive polymer layers, and the ratio of the film thickness of the corner part of each of the second to fourth conductive polymer layers to the film thickness of the planar part of each of the second to fourth conductive polymer layers are shown in Table 1.

Comparative Example 1

A solid electrolytic capacitor was manufactured by the same method as in Example 1 except that the block layer was not formed. Like in Example 1, the leakage current failure rate at the time of an inspection performed when the solid electrolytic capacitor was manufactured, the film thickness of the corner part of the second conductive polymer layer, and the ratio of the film thickness of the corner part of the second conductive polymer layer to the film thickness of the planar part of the second conductive polymer layer are shown in Table 1.

Comparative Example 2

A second conductive polymer layer was formed using PEDOT-PSS a plurality of times instead of forming the second conductive polymer layer composed of a self-doped-type conductive polymer. A solid electrolytic capacitor was manufactured by the same method as in Example 1 except for the above point.

Specifically, the capacitor element in which the first conductive polymer layer was formed was immersed in a PEDOT-PSS aqueous dispersion liquid and was pulled up therefrom. After that, the obtained capacitor element was dried at 120° C. for 30 minutes. The operations from the immersion in the PEDOT-PSS aqueous dispersion liquid to the drying were repeated eight times, whereby the second conductive polymer layer composed of a film-like PEDOT-PSS was formed on the first conductive polymer layer. After the second conductive polymer layer made of PEDOT-PSS was formed, a graphite layer and a silver layer were sequentially formed. In this manner, the solid electrolytic capacitor was manufactured, like in Example 1. Like in Example 1, the leakage current failure rate at the time of an inspection performed when the solid electrolytic capacitor was manufactured, the film thickness of the corner part of the second conductive polymer layer, and the ratio of the film thickness of the corner part of the second conductive polymer layer to the film thickness of the planar part of the second conductive polymer layer are shown in Table 1.

TABLE 1

| | Leakage current failure rate (ppm) | Film thickness of corner part (μm) | Ratio of film thicknesses (corner part/ planar part) |
| --- | --- | --- | --- |
| Example 1 | 42 | 10 | 0.7 |
| Example 2 | 60 | 7 | 0.5 |
| Example 3 | 25 | 13 | 1.4 |
| Example 4 | 65 | 7 | 0.5 |
| Example 5 | 10 | 30 | 1.1 |
| Comparative Example 1 | 520 | — | — |
| Comparative Example 2 | 98 | 6 | 0.2 |

As shown in Table 1, the leakage current failure rate in each of Examples 1-5 was lower than those in Comparative Examples 1 and 2. Further, in Examples 1-5, the film thickness of the corner part of the second conductive polymer layer and the ratio of the film thicknesses exhibited good values.

In Comparative Example 1, when the second conductive polymer layer composed of a self-doped-type conductive polymer was formed, the self-doped-type conductive polymer infiltrated into the first conductive polymer layer in which the conductive polymer was formed using chemical polymerization or the pores of the porous anode body, which prevented the second conductive polymer layer from being formed on the first conductive polymer layer.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:
1. A solid electrolytic capacitor comprising:
an anode body made of a valve metal;
a dielectric layer formed on the anode body; and
a solid electrolyte layer formed on the dielectric layer,
   wherein
   the solid electrolyte layer comprises:
      a first conductive polymer layer that is formed on the dielectric layer and is heterogeneously doped with a monomolecular dopant;
      a block layer formed on the first conductive polymer layer; and
      a second conductive polymer layer that is formed on the block layer and is composed of a self-doped-type conductive polymer containing a plurality of side chains containing a functional group that can be doped,
   the block layer blocks a migration of the self-doped-type conductive polymer from the second conductive polymer layer into the first conductive polymer layer and/or a migration of the self-doped-type conductive polymer from the second conductive polymer layer into pores of the anode body, and the block layer is formed using a conductive polymer heterogeneously doped with a polymer dopant.

2. The solid electrolytic capacitor according to claim 1, wherein the block layer includes an antioxidant.

3. The solid electrolytic capacitor according to claim 1, wherein the solid electrolyte layer comprises a plurality of block layers and a plurality of second conductive polymer layers alternately laminated on the first conductive polymer layer.

4. The solid electrolytic capacitor according to claim 1, wherein the first conductive polymer layer is formed using at least one substance selected from a group consisting of polypyrrole, polythiophene, polyaniline, and derivatives thereof.

5. The solid electrolytic capacitor according to claim 1, wherein the second conductive polymer layer is formed using a self-doped-type conductive polymer that is composed of polypyrrole, polythiophene, or polyaniline, and that contains a plurality of side chains containing a functional group that can be doped.

6. The solid electrolytic capacitor according to claim 1, wherein a ratio of a film thickness of a corner part of the second conductive polymer layer to a film thickness of a planar part of the second conductive polymer layer is not less than 0.5 nor more than 1.5.

7. A solid electrolytic capacitor comprising:
an anode body made of a valve metal;
a dielectric layer formed on the anode body; and
a solid electrolyte layer formed on the dielectric layer, wherein
the solid electrolyte layer comprises:
a first conductive polymer layer that is formed on the dielectric layer and is heterogeneously doped with a monomolecular dopant;
a block layer formed on the first conductive polymer layer; and
a second conductive polymer layer that is formed on the block layer and is composed of a self-doped-type conductive polymer containing a plurality of side chains containing a functional group that can be doped,
the block layer blocks a migration of the self-doped-type conductive polymer from the second conductive polymer layer into the first conductive polymer layer and/or a migration of the self-doped-type conductive polymer from the second conductive polymer layer into pores of the anode body, and
the block layer is formed of a material including amine or amine salt, and the material including the amine or the amine salt is at least one of a self-doped-type conductive polymer containing amine and a conductive polymer heterogeneously doped with a polymer dopant containing amine.

8. The solid electrolytic capacitor according to claim 7, wherein the block layer includes an antioxidant.

9. The solid electrolytic capacitor according to claim 7, wherein the solid electrolyte layer comprises a plurality of block layers and a plurality of second conductive polymer layers alternately laminated on the first conductive polymer layer.

10. The solid electrolytic capacitor according to claim 7, wherein the first conductive polymer layer is formed using at least one substance selected from a group consisting of polypyrrole, polythiophene, polyaniline, and derivatives thereof.

11. The solid electrolytic capacitor according to claim 7, wherein the second conductive polymer layer is formed using a self-doped-type conductive polymer that is composed of polypyrrole, polythiophene, or polyaniline, and that contains a plurality of side chains containing a functional group that can be doped.

12. The solid electrolytic capacitor according to claim 7, wherein a ratio of a film thickness of a corner part of the second conductive polymer layer to a film thickness of a planar part of the second conductive polymer layer is not less than 0.5 nor more than 1.5.

13. A method for manufacturing a solid electrolytic capacitor, the method comprising:
forming a dielectric layer on an anode body made of a valve metal; and
forming a solid electrolyte layer on the dielectric layer, wherein
the forming of the solid electrolyte layer comprises:
forming, on the dielectric layer, a first conductive polymer layer heterogeneously doped with a monomolecular dopant;
forming a block layer on the first conductive polymer layer; and
forming, on the block layer, a second conductive polymer layer composed of a self-doped-type conductive polymer containing a plurality of side chains containing a functional group that can be doped,
the block layer is formed of a material capable of blocking a migration of the self-doped-type conductive polymer from the second conductive polymer layer into the first conductive polymer layer and/or a migration of the self-doped-type conductive polymer from the second conductive polymer layer into pores of the anode body,
the block layer is formed of a material including amine or amine salt, and
the material including the amine or the amine salt is at least one of a self-doped-type conductive polymer containing amine and a conductive polymer heterogeneously doped with a polymer dopant containing amine.

* * * * *